(12) United States Patent
Kobayashi et al.

(10) Patent No.: US 7,489,899 B2
(45) Date of Patent: Feb. 10, 2009

(54) INFORMATION NETWORK BUILDING METHOD AND NETWORK CONNECTION CIRCUIT FOR COMMUNICATION BETWEEN TERMINALS OF A PHYSICAL PREMISES

(75) Inventors: Shinichiro Kobayashi, Hino (JP); Toshifumi Yamakawa, Sapporo (JP)

(73) Assignee: Seiko Epson Corporation (JP)

( * ) Notice: Subject to any disclaimer, the term of this patent is extended or adjusted under 35 U.S.C. 154(b) by 750 days.

(21) Appl. No.: 10/753,970

(22) Filed: Jan. 8, 2004

(65) Prior Publication Data

US 2004/0183725 A1    Sep. 23, 2004

(30) Foreign Application Priority Data

Jan. 8, 2003    (JP)    ............................. 2003-001948

(51) Int. Cl.
*H04H 20/71*    (2008.01)
*H04B 15/00*    (2006.01)

(52) U.S. Cl. ........................ 455/3.01; 455/41.2; 455/62; 455/454

(58) Field of Classification Search ................ 455/3.01, 455/3.02, 3.03, 3.04, 3.05, 41.2, 41.3, 62, 455/454
See application file for complete search history.

(56) References Cited

U.S. PATENT DOCUMENTS

| 7,215,660 | B2 * | 5/2007 | Perlman ................. 455/3.01 X |
| 2004/0053638 | A1 * | 3/2004 | Ohnaka et al. ........... 455/554.2 |
| 2004/0204102 | A1 * | 10/2004 | Kuehnel et al. .......... 455/562.1 |

FOREIGN PATENT DOCUMENTS

| JP | 2000-278551 | 10/2000 |
| JP | 2001-292335 | 10/2001 |
| JP | 2001-358742 | 12/2001 |
| JP | 2002-354439 | 12/2002 |

* cited by examiner

*Primary Examiner*—Philip J Sobutka
(74) *Attorney, Agent, or Firm*—Harness, Dickey & Pierce, P.L.C.

(57) ABSTRACT

A method is provided for building an information network via an antenna terminal or an antenna cable disposed in a house for receiving television broadcasting or radio broadcasting. The method comprises step (a) of selecting at least one frequency not used by television broadcasting or radio broadcasting in an area where the house is located; step (b) of modulating a carrier wave having the frequency selected in step (a) by using transmission data transmitted from a first information terminal and transmitting the modulated carrier wave via the antenna terminal or the antenna cable; and step (c) of receiving the carrier wave transmitted in step (b) and demodulating the carrier wave to produce reception data received by a second information terminal.

44 Claims, 5 Drawing Sheets

INFORMATION NETWORK BUILDING METHOD AND NETWORK CONNECTION CIRCUIT FOR COMMUNICATION BETWEEN TERMINALS OF A PHYSICAL PREMISES

BACKGROUND OF THE INVENTION

1. Technical Field of the Invention

The present invention relates to an information network building method for building an information network in a house and to a network connection circuit used for connecting an information terminal to such an information network.

2. Description of the Related Art

In order to build an information network in a house, it has been necessary to lay down dedicated lines for information networks at the time of building the house or after the completion of the house. These dedicated lines ensure high-speed data transfer between terminals in the house, but unfortunately they are very costly.

Alternatively, radio transceivers may be connected to the terminals in the house to establish wireless communication. This approach provides a flexible layout of the terminals in the house. Wireless communication, however, may not be stable in a reinforced-concrete house, which readily attenuates electromagnetic waves.

Still another alternative solution may be to use a power line in the house for terminal-to-terminal communication. This approach also provides a flexible layout of the terminals in the house. The power line, however, carries a high voltage and requires a high-voltage proof combiner/distributor, which is difficult to design. Furthermore, noise generated by an apparatus connected to the power line being turned ON adversely affects communication signals, compromising high-speed data transfer.

In order to overcome these problems, Japanese Unexamined Patent Application Publication No. 2000-278551 (page 2, FIG. 1) described below discloses a communication control unit for home networking that ensures high-speed communication by using existing facilities. This home networking system utilizes a network of TV coaxial cables connected to a TV signal distributor which receives a TV signal sent from an antenna. Such a TV signal distributor is now provided in a typical regular house and group housing such as a condominium. A data signal is transferred from a communication terminal in one room to a communication terminal in another room via the TV coaxial cables. To achieve this, a transceiver that modulates the data signal into a transfer signal having a different frequency from the frequency band of the TV signal sent from the antenna is connected to a wall terminal for TV signal reception provided at the end of the TV coaxial cable in each room.

This communication control unit includes a frequency converter which is connected between the antenna and the TV signal distributor. This converter converts a transmission data signal sent from a TV coaxial cable via the TV signal distributor to a reception data signal having a frequency different from that of the transmission data signal and the frequency band of the TV signal, and then transmits the reception signal to other TV coaxial cables via the TV signal distributor.

Unfortunately, this home networking system requires labor and cost of connecting the communication control unit between the antenna and the TV signal distributor. Furthermore, it may degrade the TV signal quality.

Accordingly, an object of the present invention is to provide an information network building method for constructing an information network that ensures high-speed data transfer in a house while still saving labor and cost of introducing new facilities. Another object of the present invention is to provide a network connection circuit for connecting an information terminal to such an information network.

SUMMARY

In order to overcome the problems described above, according to a first aspect of the present invention, a method for building an information network via an antenna terminal or an antenna cable disposed in a house for receiving television broadcasting or radio broadcasting includes step (a) of selecting at least one frequency not used by television broadcasting or radio broadcasting in an area where the house is located; step (b) of modulating a carrier wave having the frequency selected in step (a) by using transmission data transmitted from a first information terminal and transmitting the modulated carrier wave via the antenna terminal or the antenna cable; and step (c) of receiving the carrier wave transmitted in step (b) and demodulating the carrier wave to produce reception data received by a second information terminal.

According to a second aspect of the present invention, a method for building an information network via an antenna terminal or an antenna cable disposed in a house for receiving television broadcasting or radio broadcasting includes step (a) of selecting a first frequency and a second frequency not used by television broadcasting or radio broadcasting in an area where the house is located; step (b) of modulating a carrier wave having the first frequency by using transmission data transmitted from a first information terminal and transmitting the modulated carrier wave via the antenna terminal or the antenna cable; step (c) of receiving the carrier wave transmitted in step (b) and demodulating the carrier wave to produce reception data received by a second information terminal; step (d) of modulating a carrier wave having the second frequency by using transmission data transmitted from the second information terminal and transmitting the modulated carrier wave via the antenna terminal or the antenna cable; and step (e) of receiving the carrier wave transmitted in step (d) and demodulating the carrier wave to produce reception data received by the first information terminal.

According to a third aspect of the present invention, a method for building an information network via an antenna terminal or an antenna cable disposed in a house for receiving television broadcasting or radio broadcasting includes step (a) of selecting a plurality of frequencies not used by television broadcasting or radio broadcasting in an area where the house is located; step (b) of dividing transmission data transmitted from a first information terminal into a plurality of channels, modulating a plurality of carrier waves having the respective frequencies selected in step (a) by using the transmission data from the plurality of channels, and transmitting the modulated carrier waves via the antenna terminal or the antenna cable; and step (c) of receiving the carrier waves transmitted in step (b), demodulating the carrier waves to produce reception data over the plurality of channels, and integrating the reception data over the plurality of channels into a single data set which is received by a second information terminal.

In step (a) of the methods described above, at least one of frequencies for channels not used by television broadcasting or radio broadcasting in an area where the house is located may be selected. The methods described above may further include a step of bidirectionally transmitting data between the information network via the antenna terminal or the antenna cable and another network by converting the format of the data.

According to the first aspect of the present invention, a network connection circuit for connecting an information terminal to an antenna terminal or an antenna cable disposed in a house for receiving television broadcasting or radio broadcasting includes frequency-selecting means for selecting at least one frequency not used by television broadcasting or radio broadcasting in an area where the house is located; and transmitting means for modulating a carrier wave having the frequency selected by the frequency-selecting means by using transmission data transmitted from the information terminal and transmitting the modulated carrier wave via the antenna terminal or the antenna cable.

According to the second aspect of the present invention, a network connection circuit for connecting a first information terminal to an antenna terminal or an antenna cable disposed in a house for receiving television broadcasting or radio broadcasting includes frequency-selecting means for selecting at least one frequency not used by television broadcasting or radio broadcasting in an area where the house is located; and receiving means for receiving a carrier wave which has the frequency selected by the frequency-selecting means and has been transmitted from a second information terminal via the antenna terminal or the antenna cable and demodulating the carrier wave to produce reception data received by the first information terminal.

According to the third aspect of the present invention, a network connection circuit for connecting a first information terminal to an antenna terminal or an antenna cable disposed in a house for receiving television broadcasting or radio broadcasting includes frequency-selecting means for selecting a first frequency and a second frequency not used by television broadcasting or radio broadcasting in an area where the house is located; transmitting means for modulating a carrier wave having the first frequency selected by the frequency-selecting means by using transmission data transmitted from the first information terminal and transmitting the modulated carrier wave via the antenna terminal or the antenna cable; and receiving means for receiving a modulated carrier wave which has the second frequency and has been transmitted from a second information terminal via the antenna terminal or the antenna cable and demodulating the carrier wave to produce reception data received by the first information terminal.

According to a fourth aspect of the present invention, a network connection circuit for connecting an information terminal to an antenna terminal or an antenna cable disposed in a house for receiving television broadcasting or radio broadcasting includes frequency-selecting means for selecting a plurality of frequencies not used by television broadcasting or radio broadcasting in an area where the house is located; and transmitting means for dividing transmission data transmitted from the information terminal into a plurality of channels, modulating a plurality of carrier waves having the respective frequencies selected by the frequency-selecting means by using the transmission data from the plurality of channels, and transmitting the modulated carrier waves via the antenna terminal or the antenna cable.

According to a fifth aspect of the present invention, a network connection circuit for connecting a first information terminal to an antenna terminal or an antenna cable disposed in a house for receiving television broadcasting or radio broadcasting includes frequency-selecting means for selecting a plurality of frequencies not used by television broadcasting or radio broadcasting in an area where the house is located; and receiving means for receiving a plurality of carrier waves which have the respective frequencies selected by the frequency-selecting means and have been transmitted from a second information terminal via the antenna terminal or the antenna cable, demodulating the carrier waves to produce reception data over a plurality of channels, and integrating the reception data over the plurality of channels into a single data set which is received by the first information terminal.

In the network connection circuits described above, at least one of frequencies for channels not used by television broadcasting or radio broadcasting in an area where the house is located may automatically be selected by the frequency-selecting means.

As described above, the present invention uses the in-house antenna terminals and/or antenna cables for receiving television broadcasting or radio broadcasting to easily build an information network that ensures high-speed data transfer in the house while still saving labor and cost of introducing new facilities.

DETAILED DESCRIPTION

Embodiments according to the present invention will now be described in detail with reference to the drawings. The same components have the same reference symbols throughout the drawings, thus avoiding a repeated introduction of the same components.

Figure 1:
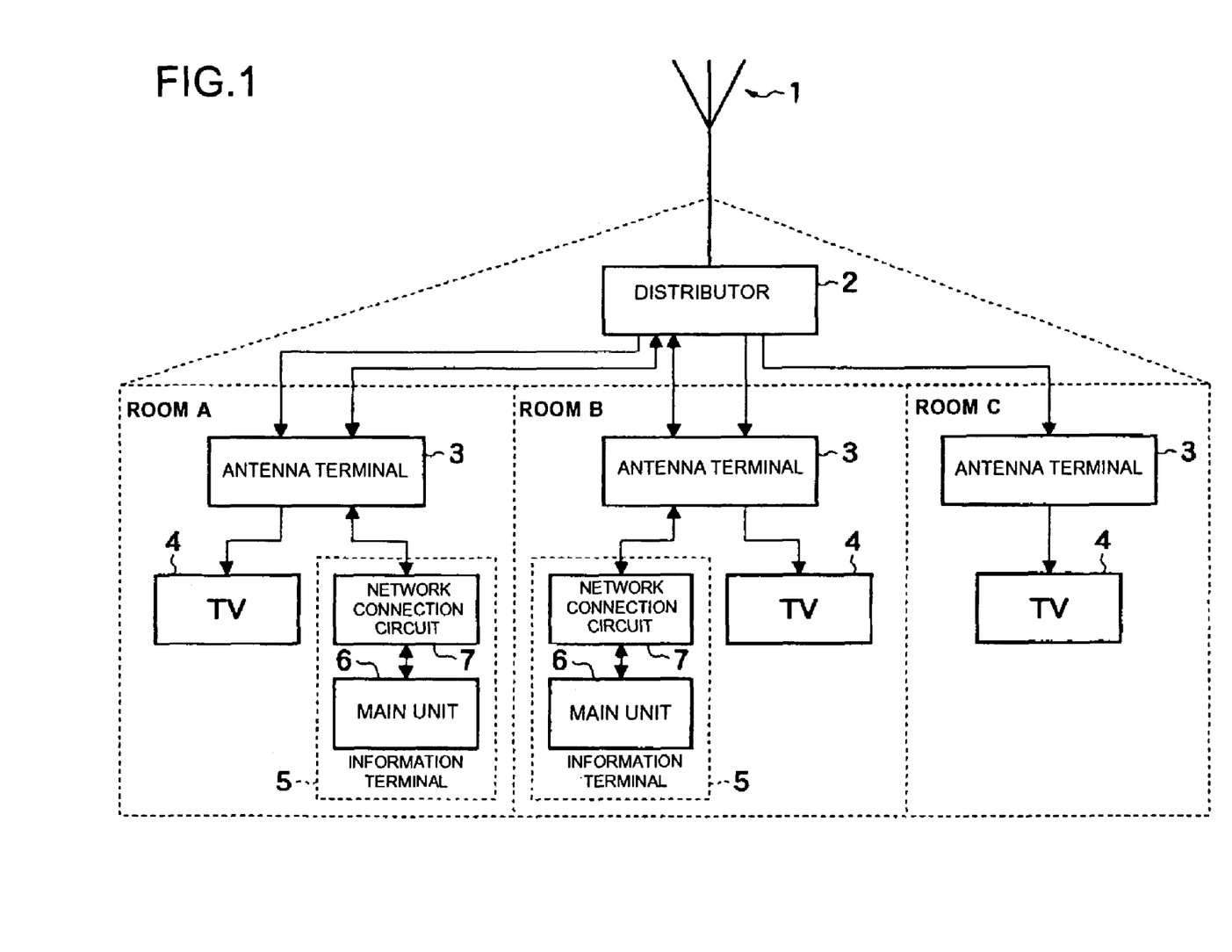
FIG. 1 shows an information network according to a first embodiment of the present invention and its peripheral components.

FIG. 1 shows an information network according to a first embodiment of the present invention and its peripheral components. As shown in FIG. 1, an antenna 1 is provided on top of a house for receiving television broadcasts or radio broadcasts and a distributor 2 is provided in the house for distributing a television signal or radio signal received by the antenna 1 to an antenna terminal 3 provided in each of rooms A, B, and C. The distributor 2 branches an antenna cable coming from the antenna 1 into a plurality of antenna cables with impedance matching so that a signal can be transmitted/received freely among these cables.

In each of the rooms A and B, a TV receiver 4 and an information terminal 5 are connected to the antenna terminal 3. The antenna cables and the antenna terminals 3 connected to the distributor 2 not only allow a TV signal from the antenna 1 to be supplied to the TV receivers 4 via the distributor 2, but also signal data to be transmitted/received among the information terminals 5 connected to the antenna terminals 3 in the rooms. The same purpose can be achieved by connecting the information terminals 5 not to the antenna terminals 3 but directly to the antenna cables.

Each of the information terminals 5 includes a main unit 6 such as a computer and a network connection circuit 7 for connecting the main unit 6 to the information network.

Each of the network connection circuits 7 may be built in the main unit 6 or connected externally to the main unit 6. If a computer is used as the main unit 6, the network connection circuit 7 can be implemented on an extension board that is connected to, for example, an internal common bus, like other standard extension boards. Data output from the computer may conform to a standard data format such as the packet format.

Data is transmitted/received by modulating a carrier wave having a selected frequency by using the transmission data. The frequency band of a carrier wave is not limited. This embodiment will be described by using a carrier wave of the UHF or VHF band as used with a TV signal.

Figure 2:
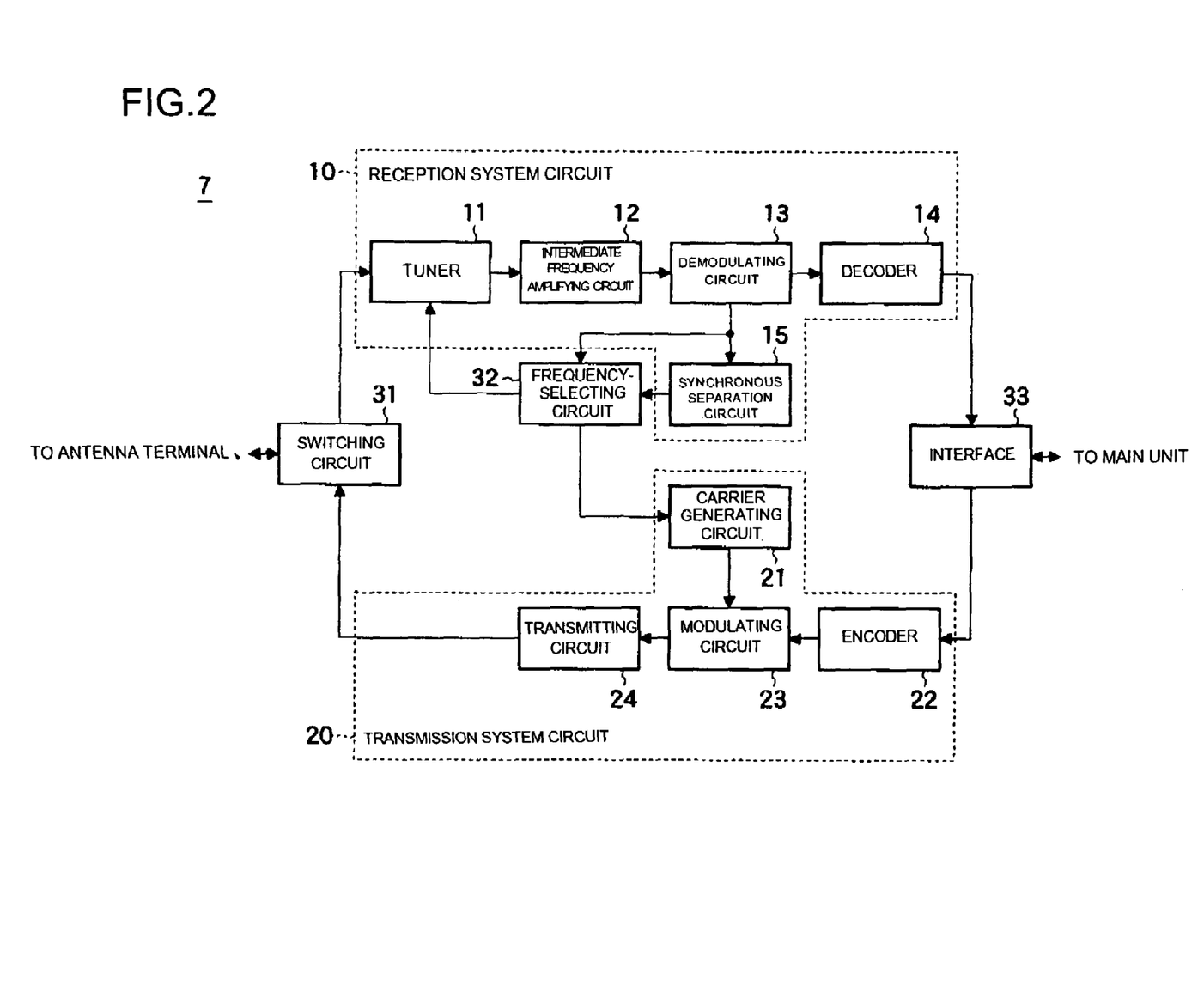
FIG. 2 is a block diagram of a network connection circuit according to the first embodiment of the present invention.

FIG. 2 is a block diagram of a network connection circuit 7 according to the first embodiment of the present invention. The network connection circuit 7 includes at least one of a reception system circuit 10 and a transmission system circuit 20; a switching circuit 31 for switching between transmission and reception by the information terminal 5; a frequency-selecting circuit 32 for selecting the frequency of a carrier wave; and an interface 33 for connection to the main unit 6 such as a computer.

The reception system circuit 10 includes a tuner 11, an intermediate-frequency amplifying circuit 12, a demodulating circuit 13, a decoder 14, and a synchronous separation circuit 15. A carrier wave received by the tuner 11 via the antenna terminal 3 or antenna cable from another information terminal 5 is converted to an intermediate-frequency signal, amplified in the intermediate-frequency amplifying circuit 12, and demodulated in the demodulating circuit 13 to produce a baseband signal.

Figure 3:
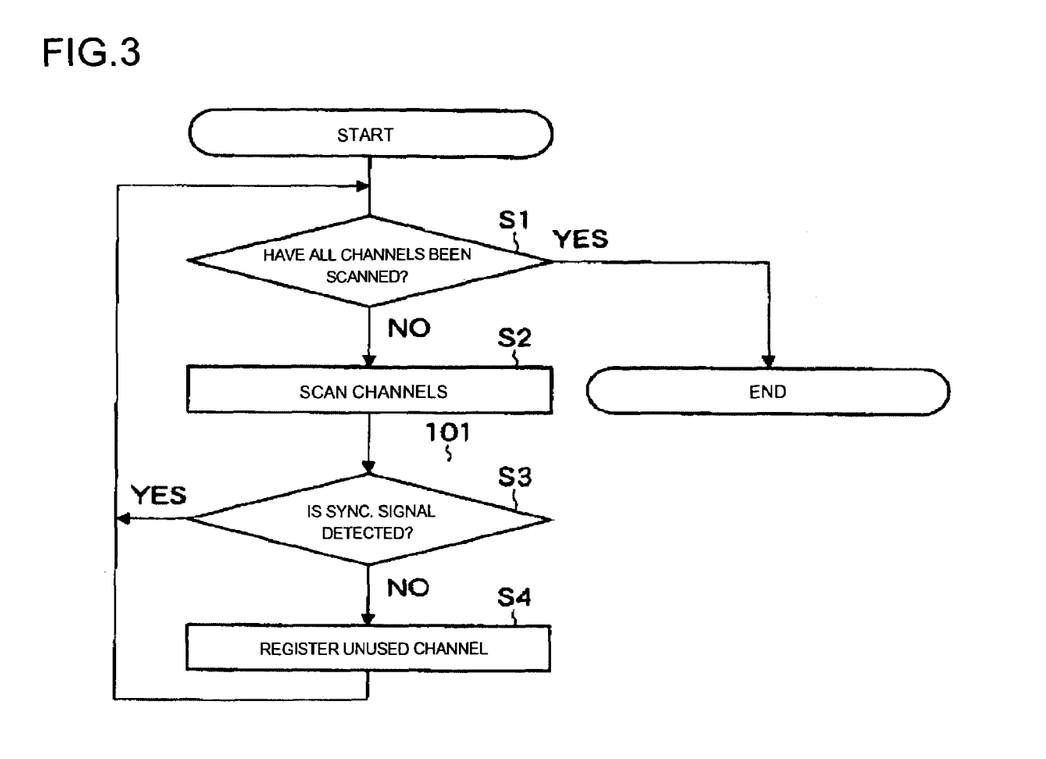
FIG. 3 is a flowchart showing the steps of selecting a channel according to the first embodiment of the present invention.

The synchronous separation circuit 15 separates the synchronous signal from the baseband signal output from the demodulating circuit 13. The frequency-selecting circuit 32 selects a frequency not used by television broadcasting in the area where the house is located, based on the baseband signal output from the demodulating circuit 13 or the signal output from the synchronous separation circuit 15 or based on an external specification. For example, the frequency-selecting circuit 32 may automatically select at least one frequency corresponding to an unused channel of television broadcasting in the area where the house is located. For this purpose, the channels that may be used by television broadcasting all over the nation are registered to the frequency-selecting circuit 32, which then controls the tuner 11 so as to select an appropriate unused channel by scanning these registered channels. FIG. 3 is a flowchart showing the steps of selecting a channel.

As shown in FIG. 3, whether all channels have been scanned is checked in step S1. If channels to be scanned are present, the channels are scanned sequentially in step S2. In step S3, while the tuner 11 is tuned to a channel, whether the signal output from the synchronous separation circuit 15 includes a horizontal or vertical sync signal for television is determined. If a sync signal is not included, the channel is registered as an unused channel in step S4. Subsequently, the same steps are repeated again from step S1.

If two or more unused channels are registered, the frequency-selecting circuit 32 selects at least one unused channel from among the registered ones. This approach advantageously prevents radio interference between television broadcasting and the information network, even if the frequency band of the radio wave used for the television broadcasting is changed or the residential area is changed.

If the network connection circuit 7 includes both the reception system circuit 10 and the transmission system circuit 20, two-way or bidirectional (full duplex) communication can be established by allowing the frequency-selecting circuit 32 to select two or more different channels so that the reception system circuit 10 and the transmission system circuit 20 can use different channels from each other. For this purpose, a distributor for connecting both the reception system circuit 10 and the transmission system circuit 20 to the antenna terminal 3 is used, instead of the switching circuit 31.

The transmission system circuit 20 includes a carrier generating circuit 21, an encoder 22, a modulating circuit 23, and a transmitting circuit 24. The carrier generating circuit 21 generates a carrier wave having a frequency selected by the frequency-selecting circuit 32. The encoder 22 applies such encoding as appropriate for the signal transmitting system to the transmission data input via the interface 33 from the main unit 6. The modulating circuit 23 modulates a carrier wave generated by the carrier generating circuit 21 by using the transmission data subjected to encoding, and the transmitting circuit 24 amplifies the modulated carrier wave into the switching circuit 31. The modulated carrier wave is sent to another information terminal 5 via the antenna terminal 3 or the antenna cable.

On the other hand, when a carrier wave transmitted via the antenna terminal 3 or the antenna cable from another information terminal 5 is received, the frequency-selecting circuit 32 controls the tuner 11 to scan the reception frequency and tunes the reception frequency to the carrier wave sent from the other information terminal 5, while avoiding the carrier waves of the television broadcasting based on the baseband signal sent from the demodulating circuit 13 or the signal output from the synchronous separation circuit 15. Alternatively, the reception frequency may be specified externally. When the reception frequency is selected in this manner, the baseband signal undergoes binary detection in the demodulating circuit 13 to produce reception data, which is then supplied to the decoder 14. The reception data decoded in the decoder 14 is output to the main unit 6 via the interface 33.

In this manner, data can be transmitted/received between the information terminal 5 of room A and the information terminal 5 of room B shown in FIG. 1. For the main unit 6, any apparatus with a function for transmitting/receiving data to/from another apparatus can be used in addition to a computer including, for example, a household appliance such as a TV receiver, a VCR, or a microwave, a bath control, or the like. For example, data can be sent from the computer included in the information terminal 5 installed in room A to the VCR included in the information terminal 5 installed in room B, thus achieving a desired timer schedule. If a weak signal in the VHF or the UHF band is used as a carrier wave, an apparatus such as a TV receiver or a VCR can be used without greatly changing their circuits.

A second embodiment according to the present invention will now be described. In the second embodiment, each network connection circuit 7 allows two or more carrier waves having different frequencies to be selected, thereby dividing wideband data into multiple channels for data transmission/reception. The other features are the same as those in the first embodiment.

Figure 4:
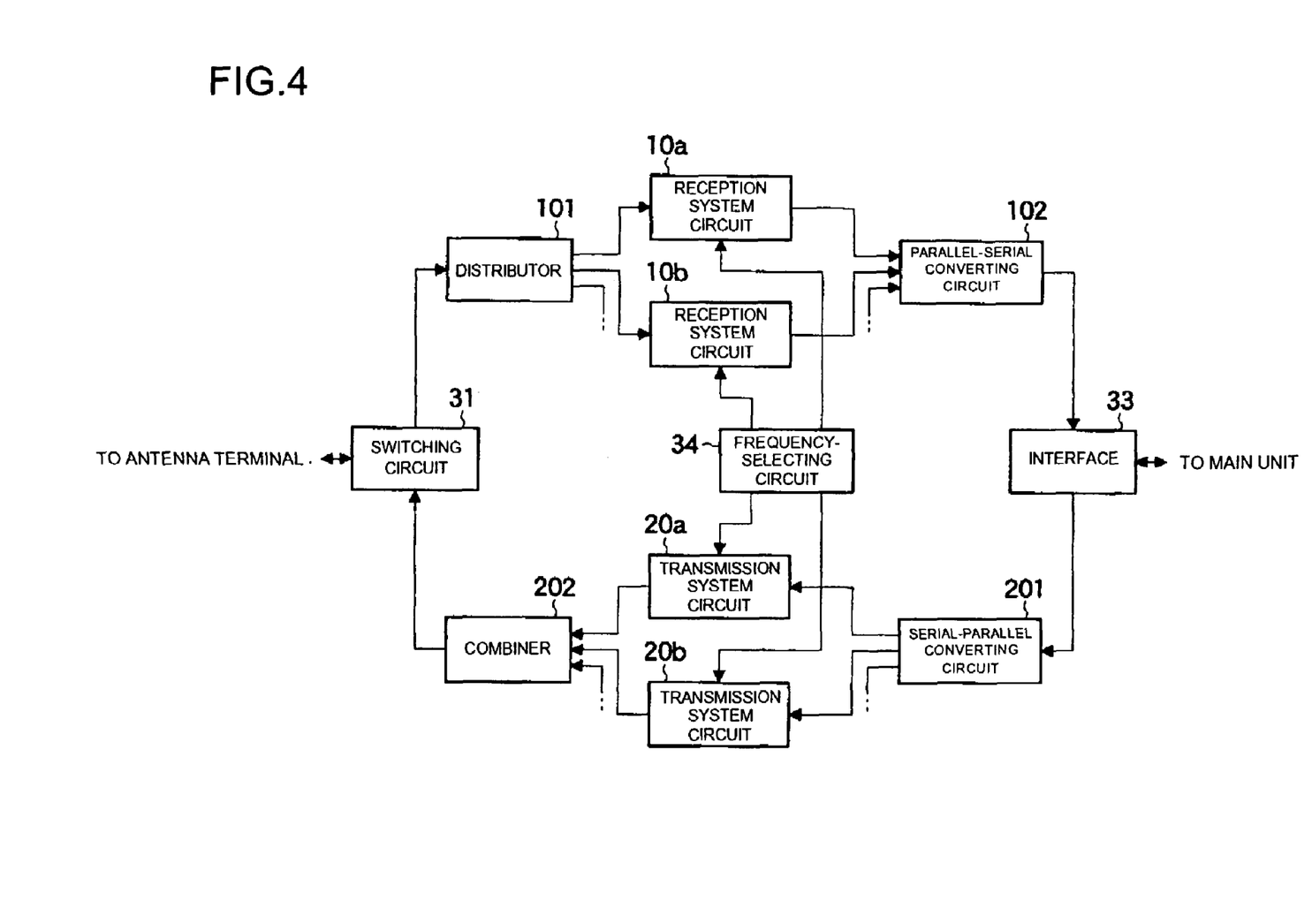
FIG. 4 is a block diagram of a network connection circuit according to a second embodiment of the present invention.

FIG. 4 is a block diagram of a network connection circuit 7 according to the second embodiment of the present invention. This network connection circuit 7 includes at least one of a reception system and a transmission system, wherein the reception system includes a distributor 101, a plurality of reception system circuits 10a, 10b, and so on, and a parallel-serial converting circuit 102; and the transmission system includes a serial-parallel converting circuit 201, a plurality of transmission system circuits 20a, 20b, and so on, and a combiner 202. The network connection circuit 7 further includes a switching circuit 31 for switching transmission and reception by the information terminal 5, a frequency-selecting circuit 34 for selecting the frequency of a carrier wave and for selecting multiple different frequencies, and an interface 33 for connection to the main unit 6 such as a computer.

For data transmission, wideband serial data input to the serial-parallel converting circuit 201 via the interface 33 from the main unit 6 are divided into multiple channels. Then the divided data items are input to the respective multiple transmission system circuits 20a, 20b, and so on.

In the transmission system circuits 20a, 20b, and so on, multiple carrier waves having different frequencies selected by the frequency-selecting circuit 34 are modulated by using transmission data from the multiple channels. The modulated carrier waves are combined in a combiner 202 and sent via the antenna terminal 3 or the antenna cable.

For data reception, multiple carrier waves sent via the antenna terminal 3 or the antenna cable from another information terminal 5 are input to the multiple reception system circuits 10a, 10b, and so on via the distributor 101. In the reception system circuits 10a, 10b, and so on, the multiple carrier waves having the respective frequencies selected by the frequency-selecting circuit 34 are selectively received and then demodulated to produce reception data across the multiple channels. These reception data are integrated into a single wideband serial data set by the parallel-serial converting circuit 102 and are output to the main unit 6 via the interface 33.

The information network according to the embodiment allows faster data communication even if the degree of modulation of the carrier waves is limited within a predetermined range. In the embodiment, two-way communication may also be adopted by using different channels between the transmission system circuits 20a, 20b, and so on and the reception system circuits 10a, 10b, and so on.

A third embodiment according to the present invention will be described. In this embodiment, two-way data transmission/reception is possible between an information network as described in the foregoing embodiments and another communication network through data format conversion.

Figure 5:
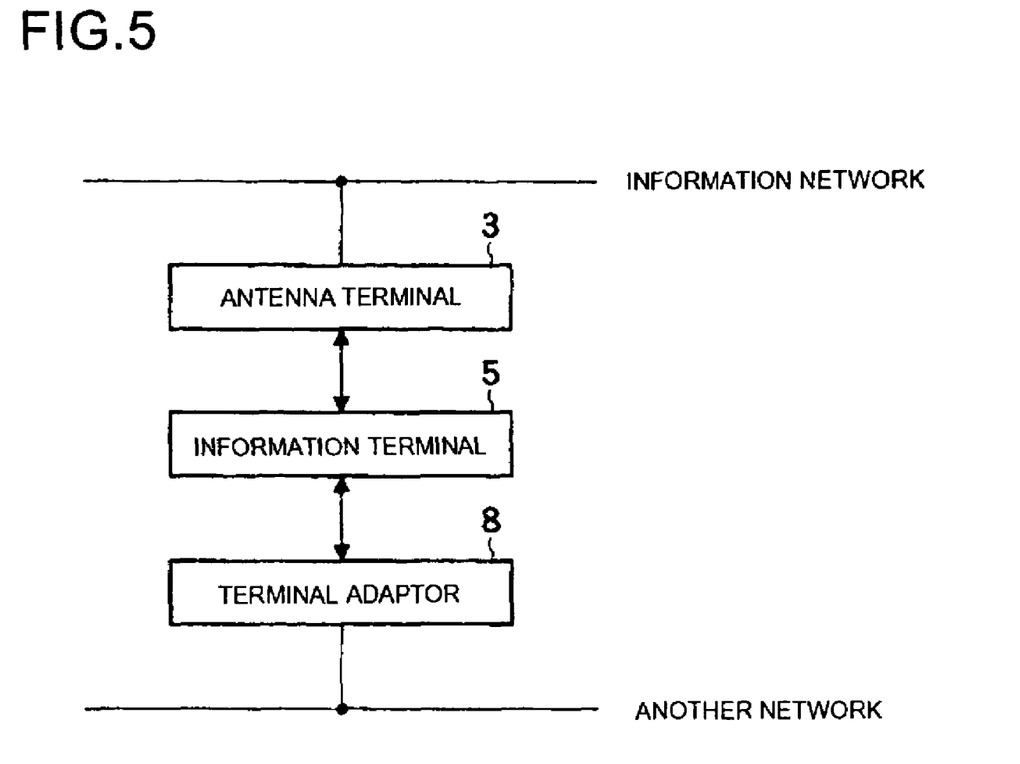
FIG. 5 is a schematic diagram illustrating how an information network according to a third embodiment of the present invention is connected to another network.

FIG. 5 is a schematic diagram illustrating how an information network according to the third embodiment of the present invention is connected to another network. A terminal adaptor 8 serves as an interface to another communication network. The terminal adaptor 8 is connected to an information terminal 5 connected to an antenna terminal 3 for the relevant information network. This structure ensures two-way data transmission/reception between the information network including the antenna terminal 3 and the antenna cable and another communication network by converting the format of the transmitted/received data.

Advantages

As described above, the present invention uses the in-house antenna terminals and/or antenna cables for receiving television broadcasting or radio broadcasting to easily build an information network that ensures high-speed data transfer in the house while still saving labor and cost of introducing new facilities.

The entire disclosure of Japanese Patent Application No. 2003-001948 filed Jan. 8, 2003 is incorporated by reference.

What is claimed is:

1. A method for building an information network via an antenna terminal or an antenna cable disposed in a house for receiving television broadcasting or radio broadcasting, the method comprising:
    step (a) of selecting at least one frequency not used by television broadcasting or radio broadcasting in an area where the house is located;
    step (b) of encoding transmission data;
    step (c) of generating a carrier wave having the frequency selected in step (a);
    step (d) of modulating said carrier wave using said encoded transmission data;
    step (e) of transmitting the modulated carrier wave via the antenna terminal or the antenna cable from a first information terminal;
    step (f) of receiving the carrier wave transmitted in step (b) and demodulating the carrier wave to produce reception data received by a second information terminal;
    step (g) receiving a first carrier wave from a first terminal and converting said carrier wave to an intermediate-frequency signal;
    step (h) amplifying said intermediate-frequency signal;
    step (i) demodulating the amplified intermediate-frequency signal to generate a baseband signal;
    step (j) separating a synchronous signal based on said baseband signal; and
    step (k) selecting said at least one frequency based on said synchronous signal.

2. The method according to claim 1, wherein, in step (a), at least one of frequencies for channels not used by the television broadcasting or radio broadcasting in an area where the house is located is selected.

3. The method according to claim 1, further comprising a step of bidirectionally transmitting data between the information network via the antenna terminal or the antenna cable and another network by converting the format of the data.

4. The method according to claim 1 comprising:
    transmitting said modulated carrier wave from a first network circuit via a first antenna terminal; and
    receiving said modulated carrier wave by a second network circuit via a second antenna terminal that is in direct communication with said first antenna terminal via a distributor.

5. The method according to claim 1 comprising:
    transmitting said modulated carrier wave from a first antenna terminal to a distributor box; and
    receiving said modulated carrier wave by a second antenna terminal from said distributor box.

6. The method according to claim 5 comprising:
    directly transmitting said modulated carrier wave from said first antenna terminal to said distributor box; and
    directly receiving said modulated carrier wave by said second antenna terminal from said distributor box.

7. A method for building an information network via an antenna terminal or an antenna cable disposed in a house for receiving television broadcasting or radio broadcasting, the method comprising:
    step (a) of selecting a first frequency and a second frequency not used by television broadcasting or radio broadcasting in an area where the house is located;
    step (b) of encoding transmission data;
    step (c) of generating a carrier wave having the first frequency selected in step (a);
    step (d) of modulating said carrier wave using said encoded transmission data transmitted from a first information terminal and transmitting the modulated carrier wave via the antenna terminal or the antenna cable;

step (e) of receiving the carrier wave transmitted in step (d) and demodulating the carrier wave to produce reception data received by a second information terminal;

step (f) of encoding transmission data;

step (g) of generating another carrier wave having the second frequency selected in step (a);

step (h) of modulating said carrier wave having the second frequency by using said encoded transmission data transmitted from the second information terminal and transmitting the modulated carrier wave via the antenna terminal or the antenna cable;

step (i) of receiving the carrier wave transmitted in step (h) and demodulating the carrier wave to produce reception data received by the first information terminal;

step (j) receiving a first carrier wave from a first terminal and converting said carrier wave to an intermediate-frequency signal;

step (k) amplifying said intermediate-frequency signal;

step (l) demodulating the amplified intermediate-frequency signal to generate a baseband signal;

step (m) separating a synchronous signal based on said baseband signal; and step (n) selecting said first and second frequencies based on said synchronous signal.

8. The method according to claim 7, wherein, in step (a), at least one of frequencies for channels not used by the television broadcasting or radio broadcasting in an area where the house is located is selected.

9. The method according to claim 7, further comprising a step of bidirectionally transmitting data between the information network via the antenna terminal or the antenna cable and another network by converting the format of the data.

10. A method for building an information network via an antenna terminal or an antenna cable disposed in a house for receiving television broadcasting or radio broadcasting, the method comprising:

step (a) of selecting a plurality of frequencies not used by television broadcasting or radio broadcasting in an area where the house is located;

step (b) of dividing transmission data transmitted from a first information terminal into a plurality of channels;

step (c) of encoding said transmission data;

step (d) of generating a plurality of carrier waves having the respective frequencies selected in step (a);

step (e) of modulating said plurality of carrier waves by using the encoded transmission data from the plurality of channels; and step (f) of transmitting the modulated carrier waves via the antenna terminal or the antenna cable;

step (g) of receiving the carrier waves transmitted in step (f), demodulating the carrier waves to produce reception data over the plurality of channels, and integrating the reception data over the plurality of channels into a single data set which is received by a second information terminal;

step (h) receiving a first carrier wave from a first terminal and converting the carrier wave to an intermediate-frequency signal;

step (i) amplifying said intermediate-frequency signal;

step (j) demodulating the amplified intermediate-frequency signal to generate a baseband signal;

step (k) separating a synchronous signal based on said baseband signal; and step (l) selecting said plurality of frequencies based on said synchronous signal.

11. The method according to claim 10, wherein, in step (a), at least one of frequencies for channels not used by the television broadcasting or radio broadcasting in an area where the house is located is selected.

12. The method according to claim 10, further comprising a step of bidirectionally transmitting data between the information network via the antenna terminal or the antenna cable and another network by converting the format of the data.

13. A network connection circuit for connecting an information terminal to an antenna terminal or an antenna cable disposed in a house for receiving television broadcasting or radio broadcasting, comprising:

frequency-selecting means for selecting at least one frequency not used by television broadcasting or radio broadcasting in an area where the house is located;

encoding means for encoding transmission data;

carrier generating means for generating a carrier wave having the frequency selected by the frequency-selecting means;

modulating means for modulating said carrier wave using transmission data transmitted from the information terminal;

transmitting means for transmitting the modulated carrier wave via the antenna terminal or the antenna cable;

first terminal tuning means for receiving a first carrier wave from a first terminal and for converting said carrier wave to an intermediate-frequency signal;

intermediate frequency means for amplifying said intermediate-frequency signal;

demodulating means for demodulating the amplified intermediate-frequency signal to generate a baseband signal; and synchronous separation means for separating a synchronous signal based on said baseband signal, wherein said frequency-selecting means selects said at least one frequency based on said synchronous signal.

14. The network connection circuit according to claim 13, wherein at least one of frequencies for channels not used by the television broadcasting or radio broadcasting in an area where the house is located is automatically selected by the frequency-selecting means.

15. The network connection circuit according to claim 13 wherein said frequency-selecting means selects a frequency based on said baseband signal.

16. A network connection circuit for connecting a first information terminal to an antenna terminal or an antenna cable disposed in a house for receiving television broadcasting or radio broadcasting, comprising:

frequency-selecting means for selecting at least one frequency not used by television broadcasting or radio broadcasting in an area where the house is located;

receiving means for receiving a carrier wave which has the frequency selected by the frequency-selecting means and has been transmitted from a second information terminal via the antenna terminal or the antenna cable; and demodulating means for demodulating the carrier wave to produce a baseband signal;

decoding means for decoding said baseband signal to generate reception data received by the first information terminal;

first terminal tuning means for receiving a first carrier wave from a first terminal and for converting said carrier wave to an intermediate-frequency signal;

intermediate frequency means for amplifying said intermediate-frequency signal;

demodulating means for demodulating the amplified intermediate-frequency signal to generate a baseband signal; and synchronous separation means for separating a synchronous signal based on said baseband signal, wherein said frequency-selecting means selects said at least one frequency based on said synchronous signal.

17. The network connection circuit according to claim 16, wherein at least one of frequencies for channels not used by the television broadcasting or radio broadcasting in an area where the house is located is automatically selected by the frequency-selecting means.

18. A network connection circuit for connecting a first information terminal to an antenna terminal or an antenna cable disposed in a house for receiving television broadcasting or radio broadcasting, comprising:

frequency-selecting means for selecting a first frequency and a second frequency not used by television broadcasting or radio broadcasting in an area where the house is located;

encoding means for encoding transmission data transmitted from the first information terminal;

carrier generating means for generating a carrier wave having the frequency selected by the frequency-selecting means;

modulating means for modulating said carrier wave using said encoded transmission data;

transmitting means for transmitting the modulated carrier wave via the antenna terminal or the antenna cable;

receiving means for receiving a modulated carrier wave which has the second frequency and has been transmitted from a second information terminal via the antenna terminal or the antenna cable;

demodulating means for demodulating the carrier wave to produce a baseband signal;

decoding means for decoding said baseband signal to generate reception data received by the first information terminal;

first terminal tuning means for receiving a first carrier wave from a first terminal and for converting said carrier wave to an intermediate-frequency signal;

intermediate frequency means for amplifying said intermediate-frequency signal;

demodulating means for demodulating the amplified intermediate-frequency signal to generate a baseband signal; and synchronous separation means for separating a synchronous signal based on said baseband signal, wherein said frequency-selecting means selects said first and second frequencies based on said synchronous signal.

19. The network connection circuit according to claim 18, wherein at least one of frequencies for channels not used by the television broadcasting or radio broadcasting in an area where the house is located is automatically selected by the frequency-selecting means.

20. A network connection circuit for connecting an information terminal to an antenna terminal or an antenna cable disposed in a house for receiving television broadcasting or radio broadcasting, comprising:

frequency-selecting means for selecting a plurality of frequencies not used by television broadcasting or radio broadcasting in an area where the house is located;

dividing means for dividing transmission data transmitted from the information terminal into a plurality of channels;

encoding means for encoding said divided transmission data;

modulating means for modulating a plurality of carrier waves having the respective frequencies selected by the frequency-selecting means by using the encoded transmission data from the plurality of channels;

transmitting means for transmitting the modulated carrier waves via the antenna terminal or the antenna cable;

first terminal tuning means for receiving a first carrier wave from a first terminal and for converting said carrier wave to an intermediate-frequency signal;

intermediate frequency means for amplifying said intermediate-frequency signal;

demodulating means for demodulating the amplified intermediate-frequency signal to generate a baseband signal; and synchronous separation means for separating a synchronous signal based on said baseband signal, wherein said frequency-selecting means selects said plurality of frequencies based on said synchronous signal.

21. The network connection circuit according to claim 20, wherein at least one of frequencies for channels not used by the television broadcasting or radio broadcasting in an area where the house is located is automatically selected by the frequency-selecting means.

22. A network connection circuit for connecting a first information terminal to an antenna terminal or an antenna cable disposed in a house for receiving television broadcasting or radio broadcasting, comprising:

frequency-selecting means for selecting a plurality of frequencies not used by television broadcasting or radio broadcasting in an area where the house is located; and receiving means for receiving a plurality of carrier waves which have the respective frequencies selected by the frequency-selecting means and have been transmitted from a second information terminal via the antenna terminal or the antenna cable;

demodulating means for demodulating the carrier waves to produce a baseband signal;

decoding means for decoding said baseband signal to generate reception data over a plurality of channels;

integrating means for integrating the reception data over the plurality of channels into a single data set which is received by the first information terminal;

first terminal tuning means for receiving a first carrier wave from a first terminal and for converting said carrier wave to an intermediate-frequency signal;

intermediate frequency means for amplifying said intermediate-frequency signal;

demodulating means for demodulating the amplified intermediate-frequency signal to generate a baseband signal; and synchronous separation means for separating a synchronous signal based on said baseband signal, wherein said frequency-selecting means selects said plurality of frequencies based on said synchronous signal.

23. The network connection circuit according to claim 22, wherein at least one of frequencies for channels not used by the television broadcasting or radio broadcasting in an area where the house is located is automatically selected by the frequency-selecting means.

24. A network connection circuit that receives television broadcasting or radio broadcasting by an antenna, comprising:

a frequency-selecting circuit that selects at least one frequency not used by the television broadcasting or the radio broadcasting in house;

an encoding circuit that encodes transmission data;
a carrier generating circuit that generates a first carrier wave having the at least one frequency selected by the frequency selecting-circuit;
a modulating circuit that modulates a modulated first carrier wave using the transmission data and the first carrier wave;
a terminal that receives a second carrier wave;
an amplifier circuit that amplifies the second carrier wave to generate an amplified second carrier wave;
a demodulating circuit that demodulates the amplified second carrier wave to generate a baseband signal; and
a synchronous separating circuit that separates a synchronous signal based on the baseband signal.

25. A network connection circuit that receives television signals or radio signals, comprising:
   a frequency-selecting circuit that selects at least one frequency not used by television broadcasting or radio broadcasting received by an antenna;
   an encoding circuit that encodes transmission data;
   a carrier generating circuit that generates a first carrier wave having the at least one frequency selected by the frequency selecting-circuit;
   a modulating circuit that modulates a modulated first carrier wave using the transmission data and the first carrier wave;
   a transmitting circuit that transmits the modulated first carrier wave;
   a terminal that receives a second carrier wave;
   an amplifier circuit that amplifies the second carrier wave to generate an amplified second carrier wave;
   a demodulating circuit that demodulates the amplified second carrier wave to generate a baseband signal; and
   a synchronous separating circuit that separates a synchronous signal based on the baseband signal.

26. A method for building an information network comprising:
   identifying an antenna terminal or an antenna cable disposed in a house for receiving television broadcasting or radio broadcasting;
   selecting at least one frequency not used by television broadcasting or radio broadcasting in an area where the house is located;
   encoding transmission data;
   generating a carrier wave having the selected at least one frequency;
   modulating the carrier wave using the encoded transmission data;
   transmitting the modulated carrier wave via the antenna terminal or the antenna cable from a first information terminal;
   receiving and demodulating the transmitted modulated carrier wave to produce reception data received by a second information terminal;
   receiving a first carrier wave from a first terminal and converting the first carrier wave to an intermediate-frequency signal;
   amplifying the intermediate-frequency signal;
   demodulating the amplified intermediate-frequency signal to generate a baseband signal;
   separating a synchronous signal based on the baseband signal; and
   selecting the at least one frequency based on the synchronous signal.

27. The method according to claim 26, wherein the selecting at least one frequency not used by television broadcasting or radio broadcasting further comprises selecting at least one frequency for channels not used by the television broadcasting or radio broadcasting in an area where the house is located.

28. The method according to claim 26, further comprising bidirectionally transmitting data between the information network via the antenna terminal or the antenna cable and another network by converting the format of the data.

29. A method for building an information network comprising:
   Identifying an antenna terminal or an antenna cable disposed in a house for receiving television broadcasting or radio broadcasting;
   selecting a first frequency and a second frequency not used by television broadcasting or radio broadcasting in an area where the house is located;
   encoding transmission data;
   generating a carrier wave having the first frequency;
   modulating the carrier wave using the encoded transmission data transmitted from a first information terminal and transmitting the modulated carrier wave via the antenna terminal or the antenna cable;
   receiving and demodulating the modulated carrier wave transmitted to produce reception data received by a second information terminal;
   encoding transmission data;
   generating another carrier wave having the second frequency;
   modulating the carrier wave having the second frequency by using the encoded transmission data transmitted from the second information terminal and transmitting the modulated carrier wave via the antenna terminal or the antenna cable;
   receiving and demodulating the transmitted modulated carrier wave to produce reception data received by the first information terminal;
   receiving a first carrier wave from a first terminal and converting the first carrier wave to an intermediate-frequency signal;
   amplifying the intermediate-frequency signal;
   demodulating the amplified intermediate-frequency signal to generate a baseband signal;
   separating a synchronous signal based on the baseband signal; and
   selecting the first and second frequencies based on the synchronous signal.

30. The method according to claim 29, wherein the selecting of the first frequency and the second frequency not used by television broadcasting or radio broadcasting further comprises selecting at least one frequency for channels not used by the television broadcasting or radio broadcasting in an area where the house is located.

31. The method according to claim 29, further comprising bidirectionally transmitting data between the information network via the antenna terminal or the antenna cable and another network by converting the format of the data.

32. A method for building an information network comprising:
   identifying an antenna terminal or an antenna cable disposed in a house for receiving television broadcasting or radio broadcasting;
   selecting a plurality of frequencies not used by television broadcasting or radio broadcasting in an area where the house is located;
   dividing transmission data transmitted from a first information terminal into a plurality of channels;
   encoding the transmission data;

generating a plurality of carrier waves having the respective selected plurality of frequencies;
modulating the plurality of carrier waves by using the encoded transmission data from the plurality of channels; and
transmitting the modulated carrier waves via the antenna terminal or the antenna cable;
receiving and demodulating the transmitted modulated carrier waves to produce reception data over the plurality of channels, and integrating the reception data over the plurality of channels into a single data set which is received by a second information terminal;
receiving a first carrier wave from a first terminal and converting the carrier wave to an intermediate-frequency signal;
amplifying the intermediate-frequency signal;
demodulating the amplified intermediate-frequency signal to generate a baseband signal;
separating a synchronous signal based on the baseband signal; and
selecting the plurality of frequencies based on the synchronous signal.

33. The method according to claim 32, wherein the selecting of the plurality of frequencies not used by television broadcasting or radio broadcasting further comprises selecting at least one frequency for channels not used by the television broadcasting or radio broadcasting in an area where the house is located.

34. The method according to claim 33, further comprising bidirectionally transmitting data between the information network via the antenna terminal or the antenna cable and another network by converting the format of the data.

35. A network connection circuit comprising:
an information terminal to be connected to an antenna terminal or an antenna cable disposed in a house for receiving television broadcasting or radio broadcasting;
a frequency-selector that selects at least one frequency not used by television broadcasting or radio broadcasting in an area where the house is located;
an encoder that encodes transmission data;
a carrier generator that generates a carrier wave having the frequency selected by the frequency-selector;
a modulator that modulates the carrier wave using transmission data transmitted from the information terminal;
a transmitter that transmits the modulated carrier wave via the antenna terminal or the antenna cable;
a first terminal tuner that receives a first carrier wave from a first terminal and converts the carrier wave to an intermediate-frequency signal;
an intermediate frequency amplifier that amplifies the intermediate-frequency signal;
a demodulator that demodulates the amplified intermediate-frequency signal to generate a baseband signal; and
a synchronous separator that separates a synchronous signal based on the baseband signal,
wherein the frequency-selector selects the at least one frequency based on the synchronous signal.

36. The network connection circuit according to claim 35, wherein at least one frequency for channels not used by the television broadcasting or radio broadcasting in the area where the house is located is automatically selected by the frequency-selector.

37. A network connection circuit comprising:
a first information terminal to be connected to an antenna terminal or an antenna cable disposed in a house for receiving television broadcasting or radio broadcasting;
a frequency-selector that selects at least one frequency not used by television broadcasting or radio broadcasting in an area where the house is located;
a receiver that receives a carrier wave which has the frequency selected by the frequency-selector and has been transmitted from a second information terminal via the antenna terminal or the antenna cable; and
a demodulator that demodulates the carrier wave to produce a baseband signal;
a decoder that decodes the baseband signal to generate reception data received by the first information terminal;
a first terminal tuner that receives a first carrier wave from a first terminal and converts the carrier wave to an intermediate-frequency signal;
an intermediate frequency amplifier that amplifies the intermediate-frequency signal;
a demodulator that demodulates the amplified intermediate-frequency signal to generate a baseband signal; and
a synchronous separator that separates a synchronous signal based on the baseband signal,
wherein the frequency-selector selects the at least one frequency based on the synchronous signal.

38. The network connection circuit according to claim 37, wherein at least one frequency for channels not used by the television broadcasting or radio broadcasting in the area where the house is located is automatically selected by the frequency-selector.

39. A network connection circuit comprising:
a first information terminal to be connected to an antenna terminal or an antenna cable disposed in a house for receiving television broadcasting or radio broadcasting;
a frequency-selector that selects a first frequency and a second frequency not used by television broadcasting or radio broadcasting in an area where the house is located;
an encoder that encodes transmission data transmitted from the first information terminal;
a carrier generator that generates a carrier wave having the frequency selected by the frequency-selector;
a modulator that modulates the carrier wave using the encoded transmission data;
a transmitter that transmits the modulated carrier wave via the antenna terminal or the antenna cable;
a receiver that receives a modulated carrier wave which has the second frequency and has been transmitted from a second information terminal via the antenna terminal or the antenna cable;
a demodulator that demodulates the carrier wave to produce a baseband signal;
a decoder that decodes the baseband signal to generate reception data received by the first information terminal;
a first terminal tuner that receives a first carrier wave from a first terminal and converts the carrier wave to an intermediate-frequency signal;
an intermediate frequency amplifier that amplifies the intermediate-frequency signal;
a demodulator that demodulates the amplified intermediate-frequency signal to generate a baseband signal; and
a synchronous separator that separates a synchronous signal based on the baseband signal,
wherein the frequency-selector selects the first and second frequencies based on the synchronous signal.

40. The network connection circuit according to claim 39, wherein at least one frequency for channels not used by the television broadcasting or radio broadcasting in the area where the house is located is automatically selected by the frequency-selector.

41. A network connection circuit comprising:

an information terminal to be connected to an antenna terminal or an antenna cable disposed in a house for receiving television broadcasting or radio broadcasting;

a frequency-selector that selects a plurality of frequencies not used by television broadcasting or radio broadcasting in an area where the house is located;

a divider that divides transmission data transmitted from the information terminal into a plurality of channels;

an encoder that encodes the divided transmission data;

a modulator that modulates a plurality of carrier waves having the respective frequencies selected by the frequency-selector by using the encoded transmission data from the plurality of channels;

a transmitter that transmits the modulated carrier waves via the antenna terminal or the antenna cable;

a first terminal tuner that receives a first carrier wave from a first terminal and converts the carrier wave to an intermediate-frequency signal;

an intermediate frequency amplifier that amplifies the intermediate-frequency signal;

a demodulator that demodulates the amplified intermediate-frequency signal to generate a baseband signal; and a synchronous separator that separates a synchronous signal based on the baseband signal, wherein the frequency-selector selects the plurality of frequencies based on the synchronous signal.

42. The network connection circuit according to claim 41, wherein at least one frequency for channels not used by the television broadcasting or radio broadcasting in the area where the house is located is automatically selected by the frequency-selector.

43. A network connection circuit comprising:

a first information terminal to be connected to an antenna terminal or an antenna cable disposed in a house for receiving television broadcasting or radio broadcasting;

a frequency-selector that selects a plurality of frequencies not used by television broadcasting or radio broadcasting in an area where the house is located; and a receiver that receives a plurality of carrier waves which have the respective frequencies selected by the frequency-selector and have been transmitted from a second information terminal via the antenna terminal or the antenna cable;

a demodulator that demodulates the carrier waves to produce a baseband signal;

a decoder that decodes the baseband signal to generate reception data over a plurality of channels;

an integrator that integrates the reception data over the plurality of channels into a single data set which is received by the first information terminal;

a first terminal tuner that receives a first carrier wave from a first terminal and converts the carrier wave to an intermediate-frequency signal;

an intermediate frequency amplifier that amplifies the intermediate-frequency signal;

a demodulator that demodulates the amplified intermediate-frequency signal to generate a baseband signal; and a synchronous separator that separates a synchronous signal based on the baseband signal, wherein the frequency-selector selects the plurality of frequencies based on the synchronous signal.

44. The network connection circuit according to claim 43, wherein at least one frequency for channels not used by the television broadcasting or radio broadcasting in the area where the house is located is automatically selected by the frequency-selector.

* * * * *